Feb. 1, 1938.  D. J. CAMPBELL  2,106,702
BRAKE DRUM COOLING DEVICE
Filed Oct. 21, 1936   2 Sheets-Sheet 1

INVENTOR
Donald J. Campbell
BY
Charles W. Dake
ATTORNEY

Feb. 1, 1938.                 D. J. CAMPBELL                  2,106,702
                          BRAKE DRUM COOLING DEVICE
                           Filed Oct. 21, 1936         2 Sheets-Sheet 2
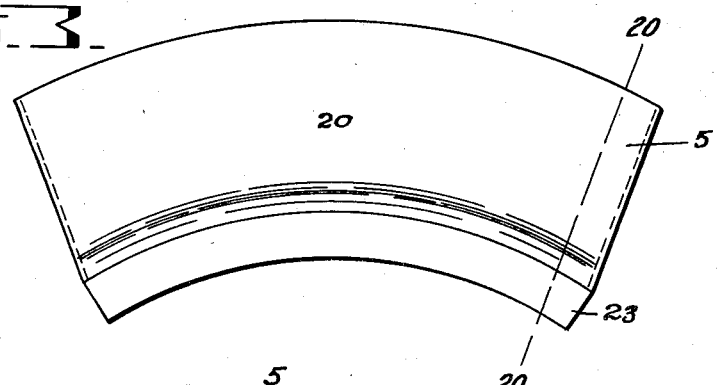
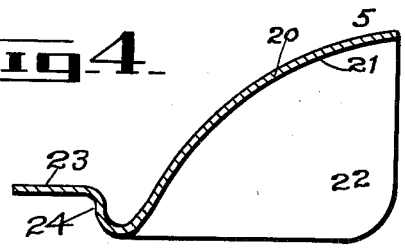
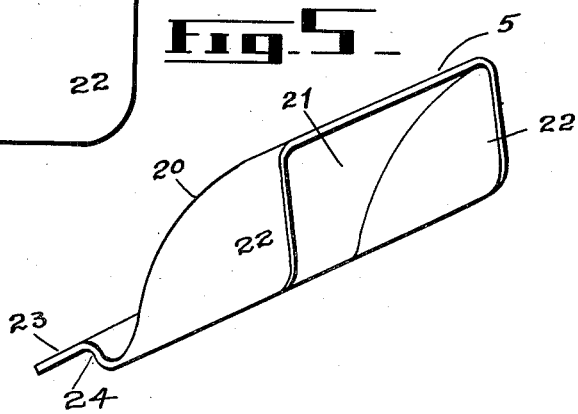
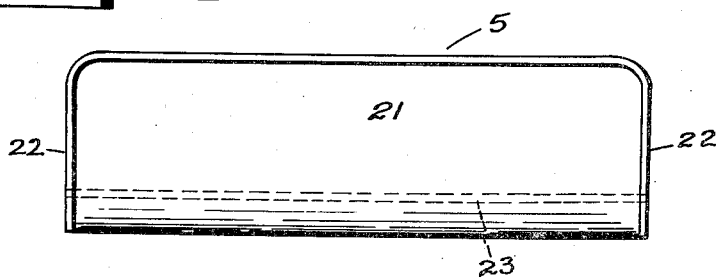
INVENTOR
Donald J. Campbell
BY
Charles W. Dake
ATTORNEY Patented Feb. 1, 1938

2,106,702

UNITED STATES PATENT OFFICE 2,106,702

BRAKE DRUM COOLING DEVICE

Donald J. Campbell, Spring Lake Township, Ottawa County, Mich.

Application October 21, 1936, Serial No. 106,827

1 Claim. (Cl. 188—264)

My present invention relates to improvements pertaining to brake drum cooling, and particularly to devices and method of cooling the brake drums and wheel parts of road vehicles; and the principal objects of my improvements are, to cool and prevent overheating of vehicle brake drums during long periods of time when the braking shoes are applied to the braking surface of the brake drum, as when it is required to apply the brakes when the vehicle is travelling down long incline grades and also when travelling down steep grades with the braking mechanism very forcibly applied.

I attain these objects together with other objects that will be apparent from a perusal of the following description and the device illustrated in the accompanying drawings, in which:

Figure 3 is a side view of one of the air deflectors.

Figure 4 is a sectional view of one of the air deflectors taken on line 20—20 of Figure 3 as when looking in the direction the arrow indicates.

Figure 5 is a perspective view of one of the air deflectors, and

Figure 6 is a front view of one of the air deflectors.

Similar numerals refer to similar parts throughout the several views, and referring thereto:

Figure 1:
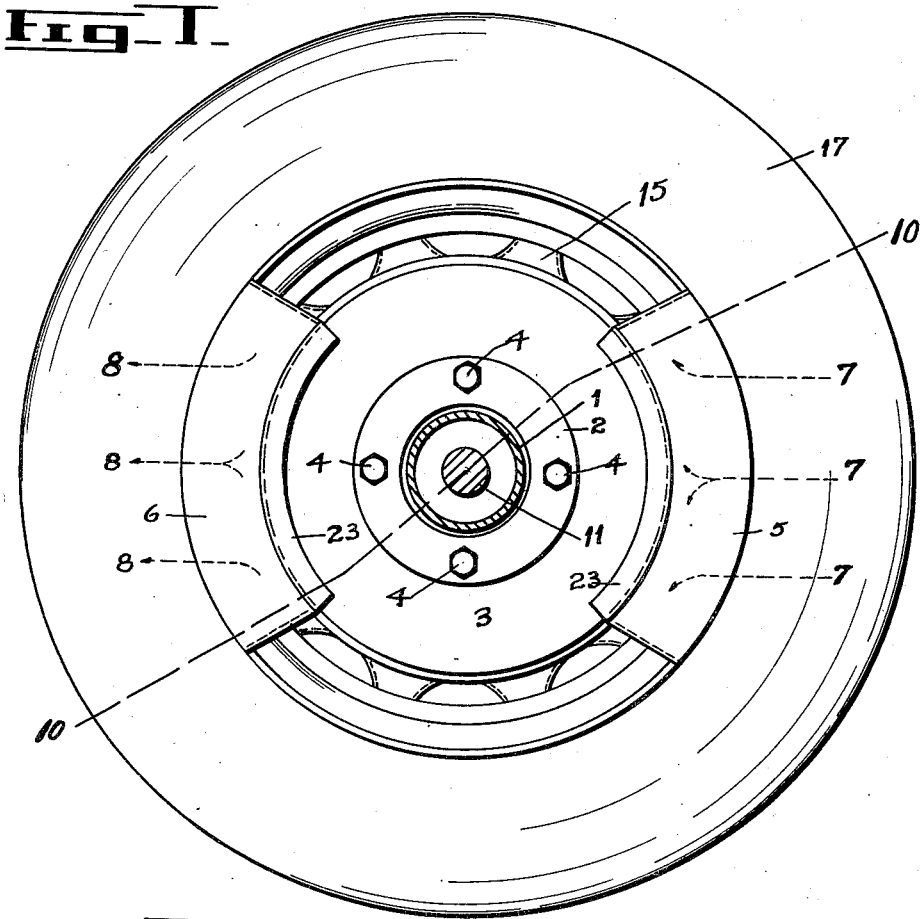
Figure 1 is a side elevation including a portion of the vehicle wheel and the resilient tire therefor.
Figure 2:
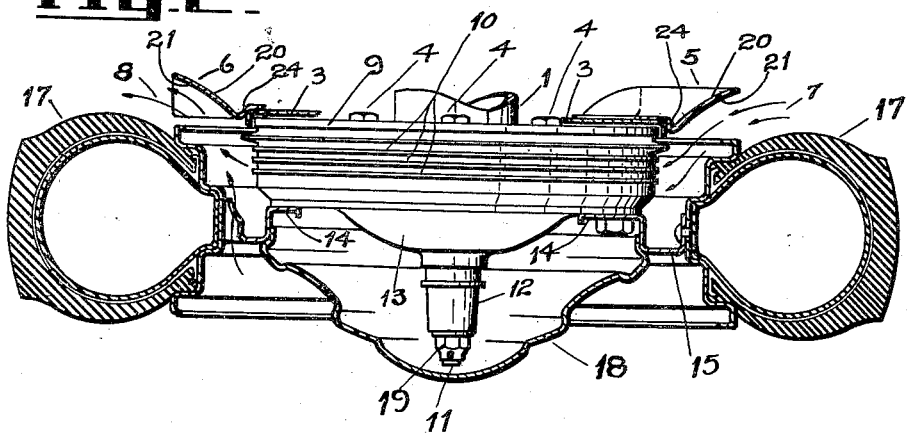
Figure 2 is a cross-sectional view taken on line 10—10 of Figure 1, in which the brake drum is not in section.

1 represents a broken off end of the rear axle housing of an automobile; 2, the flange adjacent the end of the said housing integral therewith and to which the brake drum closing cover 3 is secured as by bolts or screws 4. 5 represents the forward air deflector and 6 the rear air deflector, both flaring outwardly and secured to the closing cover 3 as by a flange riveted or welded to the cover 3. Arrows 7 indicate the air flow current as trained against the brake drum by the forward air deflector 5 when the vehicle is moving forward and arrows 8 indicate the air flow current as trained or drawn from around the brake drum by the rear air deflector 6. 9 represents the brake drum provided at its inner periphery with a braking surface and having encircling its periphery a plurality of outward, radially extending spaced apart ribs 10, and supported concentric with the shaft 11 by the wheel hub 12 and supporting back 13 having secured thereto flange 14 of the vehicle wheel structure 15 carrying wheel rim 16 and tire 17, preferably of any well known pneumatic tire construction. Dust excluding cover 18 encloses end of axle 11, hub 12, supporting back 13 and castellated nut 19 retaining the hub 12 on the axle 11.

Referring to the air deflectors 5 and 6, each consists of a curved wall 20 having concave surface 21 inclined outward from the closing cover 3 and having at each of their ends inwardly extending flanges 22, flange 23 over-lapping the periphery of the closing cover and placement shoulder 24 formed by pressing the curved wall 20 into a reverse bend.

Brake drums as at present are of three general types of construction, one consisting of the one-piece drum pressed from sheet steel, the all-cast steel or iron drum and the brake drum produced by lining a preformed sheet steel shell with cast iron alloyed with other metals. The latter drum while having the higher heat transfer factor of the three types, will like the two first mentioned types, when subjected to the severe application of the braking mechanism required to retard and bring the vehicle to stop from high vehicle speed, and when the braking mechanism is applied to keep the vehicle under control when descending long or steep road grades, become heated to such an extent that considerable expansion of the brake drum takes place, causing the braking efficiency to be materially lowered, at times to an extent that the braking mechanism will not contact the braking surface of the brake drum with sufficient force so that the friction thereof will bring the vehicle under control. With my present invention, the brake drum does not heat to an extent sufficient to cause material expansion of the brake drum and thereby lower its braking efficiency as in operation when the vehicle is travelling forward air is deflected and forced into the space at the outer periphery of the brake drum by the concave curved surface 21 of the forwardly moving air deflector 6 and is drawn or sucked from said space by suction created by the rear deflector 5 and when the vehicle is traveling in the opposite or backward direction, the direction of air flow is reversed, the deflector 5 then is the forward or leading deflector and 6 becomes the deflector that sucks or draws the air out of the space surrounding the exterior of the brake drum. The two air deflectors are so formed that they can act equally for forcing air to circulate around the outer periphery of the brake drum and for withdrawing air from the brake drum's exterior circumference. Regardless of the direction the vehicle is traveling, air will be forced to the exterior of the brake drum by the leading deflector and withdrawn by the trailing deflector and thereby caused to circulate against the annular ribs 10 as well as the outer periphery of the brake drum thus maintaining the brake drum at a temperature that will assure safe braking of the vericle.

Having described my present invention, the rights I wish to secure by Letters Patent are hereafter set forth, and I claim:

In a brake drum cooling device, the combination with a brake drum having an open end and a cover for the open end, means associated with the said cover for causing air to flow against the exterior of the brake drum and means for causing air to flow away from the exterior of the brake drum when the vehicle is in motion.

DONALD J. CAMPBELL.